US012632087B2

(12) United States Patent
Lee et al.

(10) Patent No.: US 12,632,087 B2
(45) Date of Patent: May 19, 2026

(54) FOLDABLE DISPLAY DEVICE

(71) Applicant: LG Display Co., Ltd., Seoul (KR)

(72) Inventors: YongSeok Lee, Seoul (KR); HyukJoon Yoon, Goyang-si (KR); Youngki Song, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 484 days.

(21) Appl. No.: 17/976,547

(22) Filed: Oct. 28, 2022

(65) Prior Publication Data

US 2023/0213972 A1    Jul. 6, 2023

(30) Foreign Application Priority Data

Dec. 30, 2021    (KR) ........................ 10-2021-0192382

(51) Int. Cl.
G06F 1/16        (2006.01)
(52) U.S. Cl.
CPC .......... G06F 1/1647 (2013.01); G06F 1/1616 (2013.01); G06F 1/1681 (2013.01)
(58) Field of Classification Search
CPC ........ B60K 35/20; B60K 35/23; G02B 27/01; G02B 30/52; G06F 1/1616; G06F 1/1641; G06F 1/1647; G06F 1/1652; G06F 1/1681; G09F 9/301; G09F 9/302; G09F 19/125; G01S 7/52068; G01S 15/8993
See application file for complete search history.

(56) References Cited

U.S. PATENT DOCUMENTS

| | | | |
|---|---|---|---|
| 10,520,782 B2 * | 12/2019 | Busch ................... | G02B 27/017 |
| 2006/0109753 A1 * | 5/2006 | Fergason ............. | H04N 13/398 |
| | | | 369/30.01 |
| 2010/0248795 A1 * | 9/2010 | Sugimori ............ | H04M 1/0237 |
| | | | 455/575.1 |
| 2011/0228042 A1 * | 9/2011 | Gao ..................... | H04N 13/363 |
| | | | 348/E7.001 |
| 2014/0029212 A1 * | 1/2014 | Hwang ................. | H05K 1/028 |
| | | | 361/749 |
| 2015/0145969 A1 * | 5/2015 | Kim ...................... | G02B 30/27 |
| | | | 348/51 |
| 2017/0041598 A1 * | 2/2017 | Smithwick ............ | H04N 13/30 |

(Continued)

FOREIGN PATENT DOCUMENTS

| | | |
|---|---|---|
| CN | 104836865 A | 8/2015 |
| CN | 106501949 A | 3/2017 |

(Continued)

OTHER PUBLICATIONS

Office Action and Search Report dated Dec. 23, 2025, issued in Chinese Patent Application No. 202211424616.2 (with partial English translation). (Note—US 2017/0041598 A1, US 2014/0029212 A1, and US 2010/0248795 A1 cited in this CN Office Action and Search Report are already of record.).

*Primary Examiner* — Eman A Alkafawi
(74) *Attorney, Agent, or Firm* — Morgan, Lewis & Bockius LLP

(57)        ABSTRACT

A foldable display device includes a display panel in which at least a partial area includes a transparent display panel; and a floating screen connected to the display panel and reflecting an image displayed on the display panel. Therefore, a foldable display device which uses a floating screen and a display panel to display an image has more three-dimensional effect.

20 Claims, 15 Drawing Sheets

(56)        References Cited

U.S. PATENT DOCUMENTS

| | | | |
|---|---|---|---|
| 2017/0069240 A1 | 3/2017 | Bae et al. | |
| 2017/0142240 A1 | 5/2017 | Xu | |
| 2019/0025588 A1* | 1/2019 | Osterhout | G02B 13/009 |
| 2019/0278550 A1* | 9/2019 | Liu | G02B 30/28 |
| 2019/0384057 A1* | 12/2019 | Mori | G02B 27/0081 |
| 2020/0326751 A1* | 10/2020 | Kim | G06F 1/1616 |
| 2022/0018996 A1* | 1/2022 | Hirosawa | G02B 3/0006 |
| 2024/0015236 A1* | 1/2024 | Tang | H04M 1/0216 |

FOREIGN PATENT DOCUMENTS

| | | | | |
|---|---|---|---|---|
| CN | 110596799 A | | 12/2019 | |
| KR | 10-2019-0036274 A | | 4/2019 | |
| KR | 2020098416 A | * | 8/2020 | G06F 1/1616 |

* cited by examiner 171 172   173

170

171   172   173

170

171 172 173
170

FOLDABLE DISPLAY DEVICE

CROSS-REFERENCE TO RELATED APPLICATIONS

This application claims the priority of Korean Patent Application No. 10-2021-0192382 filed on Dec. 30, 2021, in the Korean Intellectual Property Office, the disclosure of which is incorporated herein by reference.

BACKGROUND

Technical Field

The present disclosure relates to a foldable display device, and more particularly to a foldable display device which is capable of displaying a stereoscopic image.

Discussion of the Related Art

Recently, as the society enters a full-scale information era, a field of a display device which processes and displays a large number information has been rapidly developed. As display devices which are used for a monitor of a computer, a television, or a cellular phone, there are an organic light emitting display device (OLED) which is a self-emitting device and a liquid crystal display device (LCD) which requires a separate light source.

An applicable range of the display device is diversified to personal digital assistants as well as monitors of computers and televisions and a display device with a large display area and a reduced volume and weight is being studied.

Specifically, recently, a flexible display device which is manufactured to be capable of displaying images even though the flexible display device is bent or folded like papers is attracting attention as a next generation display device. The flexible display device utilizes a plastic thin film transistor substrate rather than glass to be classified into a unbreakable display device having a high durability, a bendable display device which is bent without being broken, a rollable display device which is rolled, and a foldable display device which is folded. Such a flexible display device has advantages in terms of space utilization, interior, and designs and has various application fields.

SUMMARY

Accordingly, embodiments of the present disclosure are directed to a foldable display device that substantially obviates one or more of the problems due to limitations and disadvantages of the related art.

An aspect of the present disclosure is to provide a foldable display device which uses a floating screen and a display panel to display an image having more three-dimensional effect.

Another aspect of the present disclosure is to provide a foldable display device which increases a mounting angle of a floating screen to increase an available area of the display panel and enhance a three-dimensional effect of the image.

According to still another aspect of the present disclosure is to improve a visibility of a transparent display panel.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a foldable display device comprises a display panel in which at least a partial area includes a transparent display panel; and a floating screen connected to the display panel and reflecting an image displayed on the display panel.

Other detailed matters of the exemplary embodiments are included in the detailed description and the drawings.

According to the present disclosure, a foldable display device which is capable of displaying a stereoscopic image can be provided.

According to the present disclosure, an available area of the display panel is increased and a three-dimensional effect of the image is enhanced.

According to the present disclosure, a visibility and a luminance in a transparent display panel are improved and a luminance difference between the transparent display panel and a non-transparent display panel is also improved.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
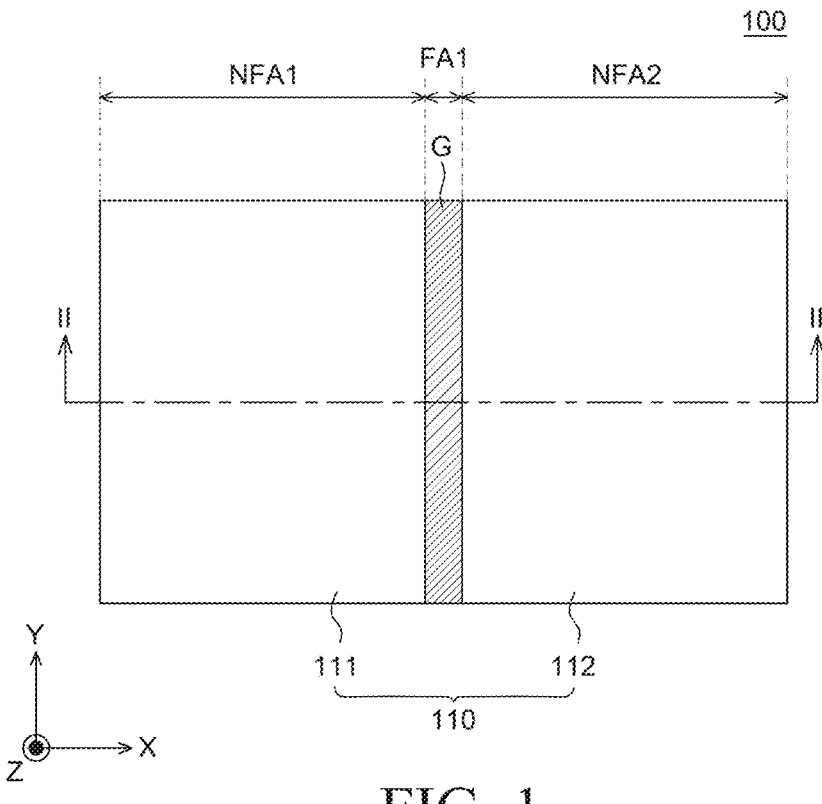
FIG. 1 is a schematic plan view of a foldable display device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a display device according to exemplary embodiments of the present disclosure will be described in detail with reference to accompanying drawings.

Figure 2:
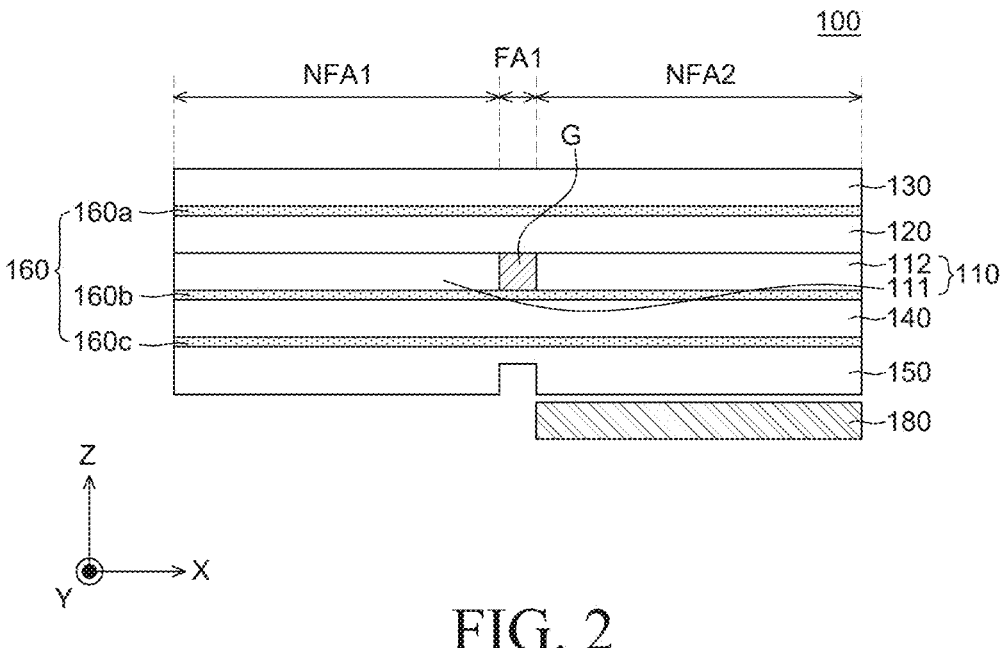
FIG. 2 is a schematic cross-sectional view taken along the line II-II' of FIG. 1.

FIG. 1 is a schematic plan view of a foldable display device according to an exemplary embodiment of the present disclosure. FIG. 2 is a schematic cross-sectional view taken along the line II-II' of FIG. 1.

The foldable display device 100 according to the exemplary embodiment of the present disclosure includes a display panel 110, a polarization film 120, a cover window 130, a top plate 140, a bottom plate 150, a back plate 180, and a gap maintaining unit G.

Referring to FIGS. 1 and 2, the foldable display device 100 according to the exemplary embodiment of the present disclosure includes a first non-folding area NFA1, a first folding area FA1, a second non-folding area NFA2 and a second folding area FA2. The first folding area FA1 is an area which is folded when the foldable display device 100 is folded.

The first folding area FA1 is an area folded when the foldable display device 100 is folded so that the first folding area FA1 may be folded along a specific radius of curvature with respect to the folding direction, that is, with respect to an X-axis direction of FIG. 1. When the first folding area FA1 is folded with respect to the folding direction (X-axis direction), the first folding area FA1 may form a part of a circle or an oval. At this time, a radius of curvature of the first folding area FA1 may refer to a radius of a circle or an oval formed by the first folding area FA1.

The first non-folding area NFA1 and the second non-folding area NFA2 are not folded when the foldable display device 100 is folded. That is, the first non-folding area NFA1 and the second non-folding area NFA2 maintain a flat state when the foldable display device 100 is folded. When the first folding area FA1 is folded with respect to the folding direction, the first non-folding area NFA1 and the second non-folding area NFA2 may overlap each other. At this time, upper surfaces of the first non-folding area NFA1 and the second non-folding area NFA2 become display surfaces and the first folding area may be inner-folded such that the first non-folding area NFA1 and the second non-folding area NFA2 are folded to be opposite to each other.

Referring to FIG. 2, the display panel 110 is a panel in which images are implemented. Display elements for implementing images and circuit units for driving the display elements may be disposed in the display panel. For example, when the foldable display device 100 is an organic light emitting display device, the display element may include an organic light emitting diode. Hereinafter, for the convenience of description, it is assumed that the foldable display device 100 according to various exemplary embodiments of the present disclosure is a foldable display device including an organic light emitting diode, but the present disclosure is not limited thereto.

The circuit units may include various thin film transistors, capacitors, wiring lines, and driving ICs for driving the organic light emitting diode. For example, the circuit units may include various configurations such as a driving thin film transistor, a switching thin film transistor, a storage capacitor, a gate line, a data line, a gate driver IC, and a data driver IC, but are not limited thereto.

In the display panel 110, a flexible substrate on which a driving thin film transistor and a light emitting diode are formed is encapsulated by an encapsulation unit so that in order to implement a flexibility, the display panel 110 includes a flexible substrate having a very thin thickness and a display element disposed on the flexible substrate.

The flexible substrate may be formed of an insulating material having a flexibility, for example, may be an insulating plastic substrate selected from polyimide, polyethersulfone, polyethylene terephthalate, and polycarbonate.

The display panel 110 includes a first display panel 111 disposed in the first non-folding area NFA1 and a second display panel 112 disposed in the second non-folding area NFA2. The first display panel 111 may be a transparent display panel and the second display panel 112 may be a non-transparent display panel. That is, light emitted from the first display panel 111 which is a transparent display panel may be visible from both an upper surface and a lower surface and light emitted from the second display panel 112 which is a non-transparent display panel is visible only from the upper surface. Therefore, the second display panel 112 may be a display panel which is generally used. The first display panel 111 is a transparent display panel so that a plurality of pixels of the first display panel 111 includes a transmission unit and an emission unit. At this time, the display element may be disposed only in the emission unit, or disposed in the emission unit and the transmission unit. Further, a circuit unit for driving the display element may be disposed only in the emission unit. However, it is not limited thereto and the display element of the first display panel 111 may be set in various forms.

Referring to FIGS. 1 and 2, the gap maintaining unit G is disposed between the first display panel 111 and the second display panel 112. That is, the gap maintaining unit G is disposed between the first display panel 111 which is a transparent display panel and the second display panel 112 which is a non-transparent display panel. The gap maintaining unit G may use a material having a high compressibility, and for example, a silicon based pad. A compression strain of the gap maintaining unit G may be 10 to 50%, but is not limited thereto.

The polarization film 120 is disposed on the display panel 110. The polarization film 120 polarizes light emitted from the display panel 110 at a polarization angle. The polarization film 120 emits light which is polarized at a polarization angle to the outside. The polarization film 120 may include a function of blocking reflection of light excluding light which is polarized at a polarization angle, among external light.

In order to protect the display panel 110 from the external impact and suppress the damage such as scratches, the cover window 130 is disposed above the display panel 110. The cover window 130 may be implemented by a soft plastic based cover which is foldable, to ensure the thin thickness and the flexibility of the foldable display device 100.

Further, a touch panel which forms a touch sensor may be optionally disposed between the display panel 110 and the cover window 130 as needed.

The bottom plate 150 for supporting the display panel 110 is disposed on rear surfaces of the display panel 110 and the gap maintaining unit G. The bottom plate 150 supports the flexible substrate which configures the display panel 110 not to be sagged and protects components disposed on the flexible substrate from external moisture, heat, and shocks. Further, the bottom plate 150 supports the display panel 110 and reduces an overall thickness of the foldable display device 100 to reduce a radius of curvature of the first folding area FA1.

The bottom plate 150 may be formed of a transparent material. For example, the bottom plate 150 may be formed of glass and has a thickness of approximately 100 μm, but is not limited thereto.

The bottom plate 150 may include a plurality of patterns in an area corresponding to the first folding area FA1. Here, the plurality of patterns may have a groove shape as illustrated in FIG. 2 or a hole shape. As the bottom plate 150 includes a plurality of patterns, it helps the foldable display device 100 to be easily folded and then easily unfolded after being folded to improve the folding performance of the foldable display device 100.

Further, according to an exemplary embodiment of the present disclosure, the top plate 140 which supports the display panel 110 together with the bottom plate 150 may be included between the display panel 110 and the bottom plate 150. When the foldable display device 100 is folded, the top plate 140 maintains the curvature of the display panel 110 to be constant and suppresses the crease generated on the upper surface of the display panel 110.

The top plate 140 may be formed of a transparent material. For example, the top plate 140 may be formed of glass and has a thickness of approximately 30 μm, but is not limited thereto.

The cover window 130, the polarization film 120, the display panel 110, the top plate 140, and the bottom plate 150 described above are attached by means of the adhesive layer 160. For example, the first adhesive layer 160a is disposed between the cover window 130 and the polarization film 120 to bond the cover window 130 and the polarization film 120 to each other. The second adhesive layer 160b is disposed between the display panel 110 and the top plate 140 to bond the display panel 110 and the top plate 140 to each other. The third adhesive layer 160c is disposed between the top plate 140 and the bottom plate 150 to bond the top plate 140 and the bottom plate 150 to each other.

The back plate 180 is disposed below the back bottom 150. The back plate 180 may be disposed below the display panel 110, the top plate 140, and the bottom plate 150. The back plate 180 may overlap any one of the first display panel 111 and the second display panel 112. That is, a size of the back plate 180 is equal to the first display panel 111 and the second display panel 112. When the back plate 180 is disposed below the first display panel 111, the back plate overlaps the first display panel 111 and when the back plate 180 is disposed below the second display panel 112, the back plate overlaps the second display panel 112.

The back plate 180 may be formed of an opaque material. The back plate 180 is a configuration for improving the visibility of the first display panel 111 which is a transparent display panel and is disposed below the display panel 110. The back plate 180 may be a SUS plate, or a colored film, but is not limited thereto.

The back plate 180 is slidably configured below the display panel 110. For example, the back plate 180 may slide below the display panel 110 by means of an instrument such as a guide rail. Therefore, the back plate 180 may move so as to overlap any one of the first display panel 111 and the second display panel 112.

Hereinafter, various display states of a foldable display device 100 according to the exemplary embodiment of the present disclosure will be described in more detail with reference to FIGS. 3A to 3D.

Figure 3A:
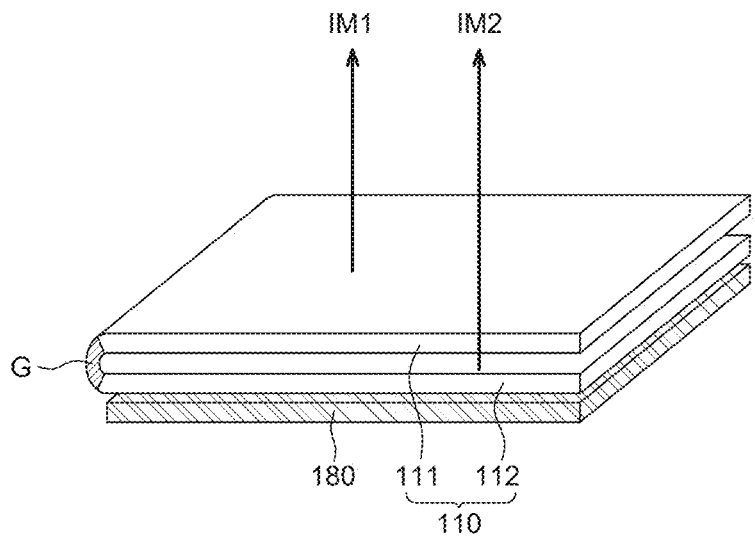
FIGS. 3A to 3D are schematic views for explaining a state of a foldable display device according to an exemplary embodiment of the present disclosure.
Figure 3B:
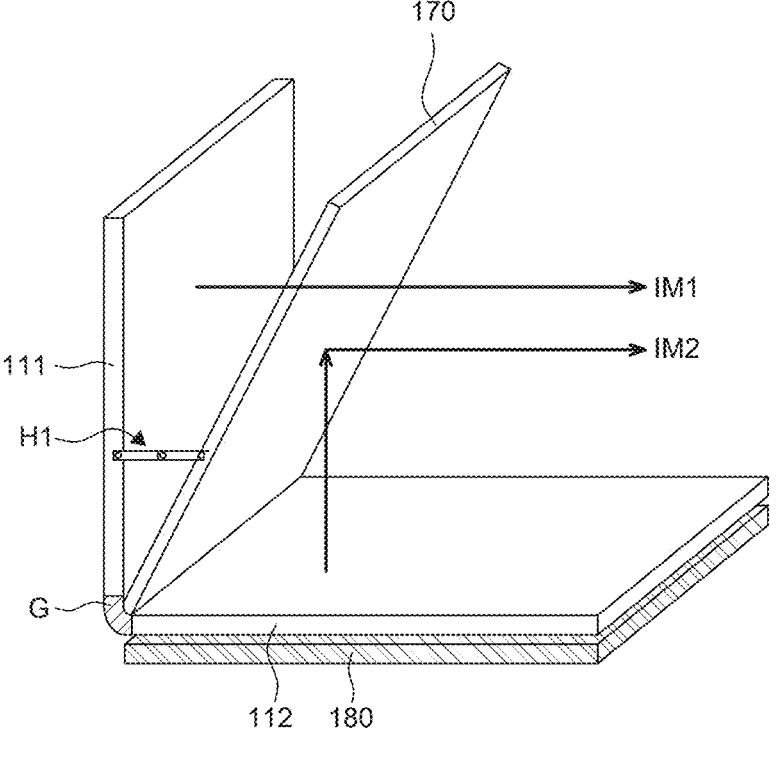
Figure 3C:
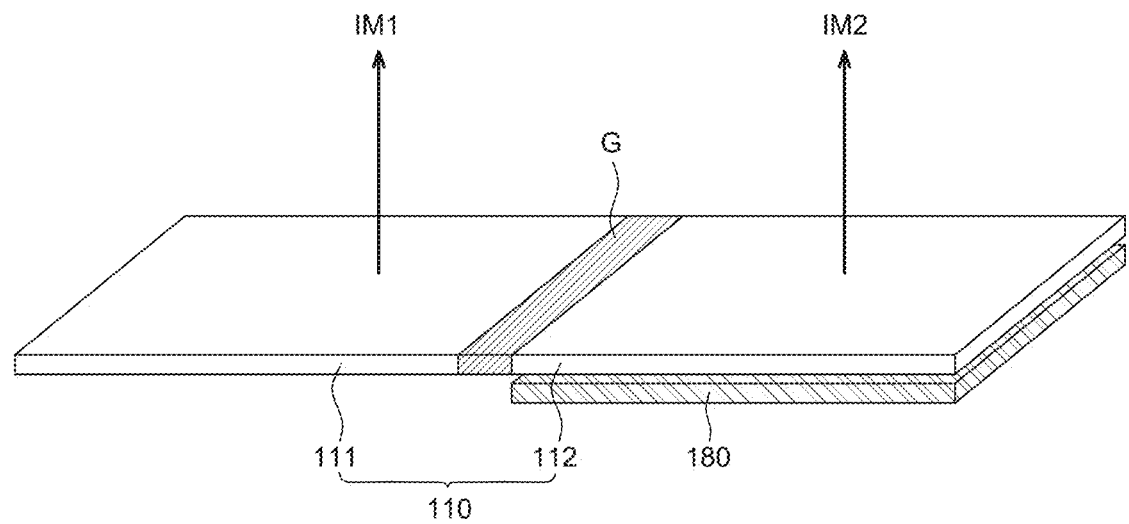
Figure 3D:
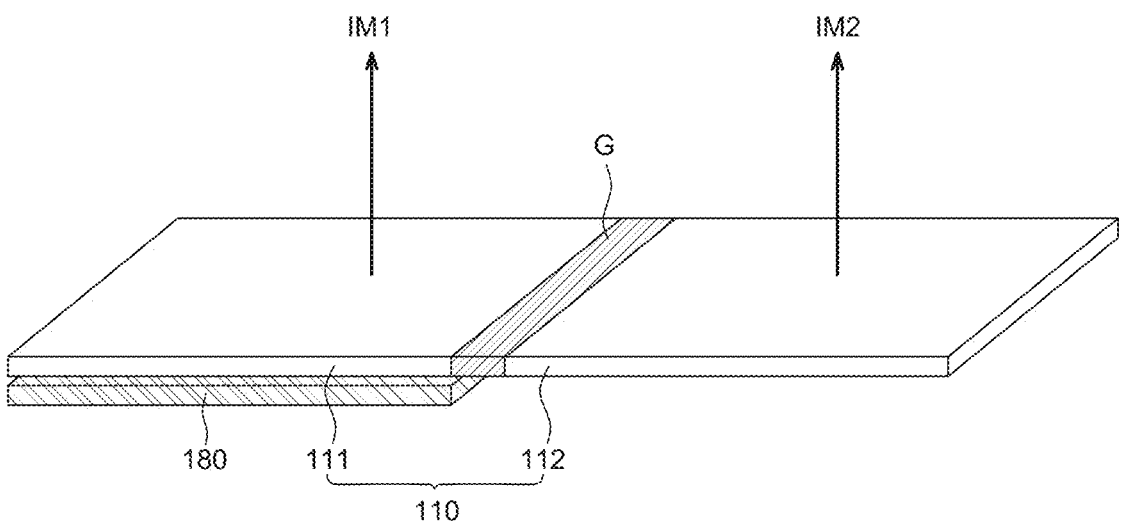

FIGS. 3A to 3D are schematic views for explaining a state of a foldable display device according to an exemplary embodiment of the present disclosure. FIG. 3A is a view illustrating a first state in which the first display panel 111 and the second display panel 112 are folded to be opposite to each other and FIG. 3B is a view illustrating a second state in which the first display panel 111 is folded to be perpendicular to the second display panel 112. Further, FIGS. 3C and 3D are views illustrating a third state in which the first display panel 111 and the second display panel 112 are completely unfolded. In FIGS. 3A to 3D, for the convenience of description, only the display panel 110, the gap maintaining unit G, the back plate 180, the floating screen 170, and a first hinge unit H1 are illustrated.

First, referring to FIG. 3A, in the first state in which the first display panel 111 and the second display panel 112 are folded to be opposite to each other, the display panel 110 may display images toward a lower surface of the first display panel 111 and an upper surface of the second display panel 112. That is, a first image IM1 from the first display panel 111 is displayed on the lower surface of the first display panel 111 and a second image IM2 from the second display panel 112 is displayed on the upper surface of the second display panel 112. That is, the first display panel 111 is a transparent display panel so that both the first image IM1 of the first display panel 111 and the second image IM2 of the second display panel 112 may be visible to the user. Alternatively, the first display panel 111 is not driven to maintain a transparent state and only the second image IM2 of the second display panel 112 is displayed.

Next, referring to FIG. 3B, in the second state in which the first display panel 111 is folded to be perpendicular to the second display panel 112, the display panel 110 may display a stereoscopic image using a floating screen 170.

Hereinafter, the stereoscopic image display using the floating screen 170 will be described in more detail with reference to FIGS. 4A to 4D.

Figure 4A:
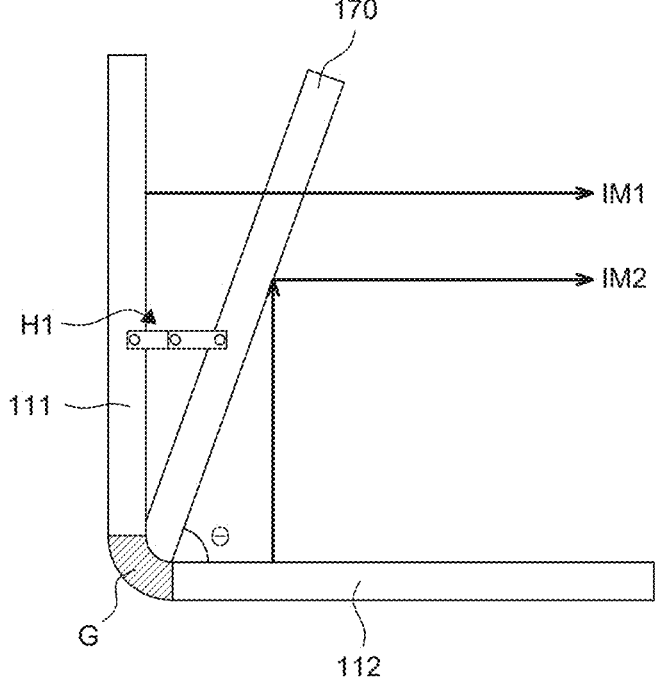
FIGS. 4A to 4D are schematic views for explaining a floating screen of a foldable display device according to an exemplary embodiment of the present disclosure.
Figure 4B:
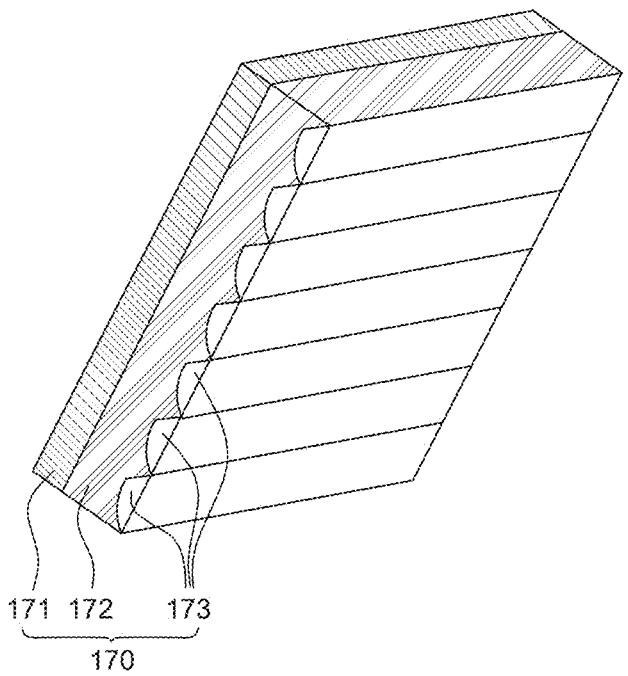
Figure 4C:
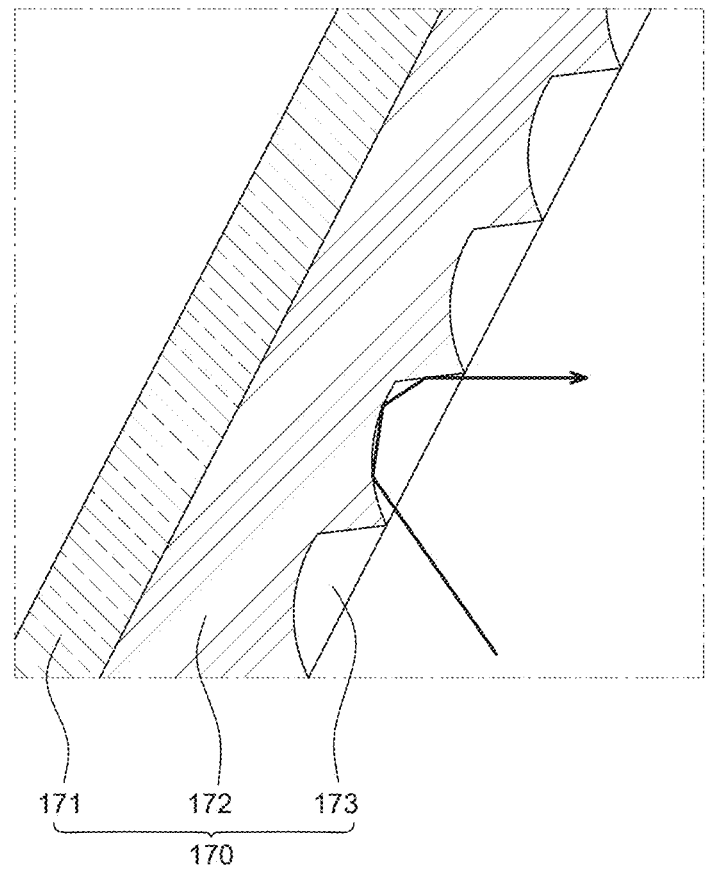
Figure 4D:
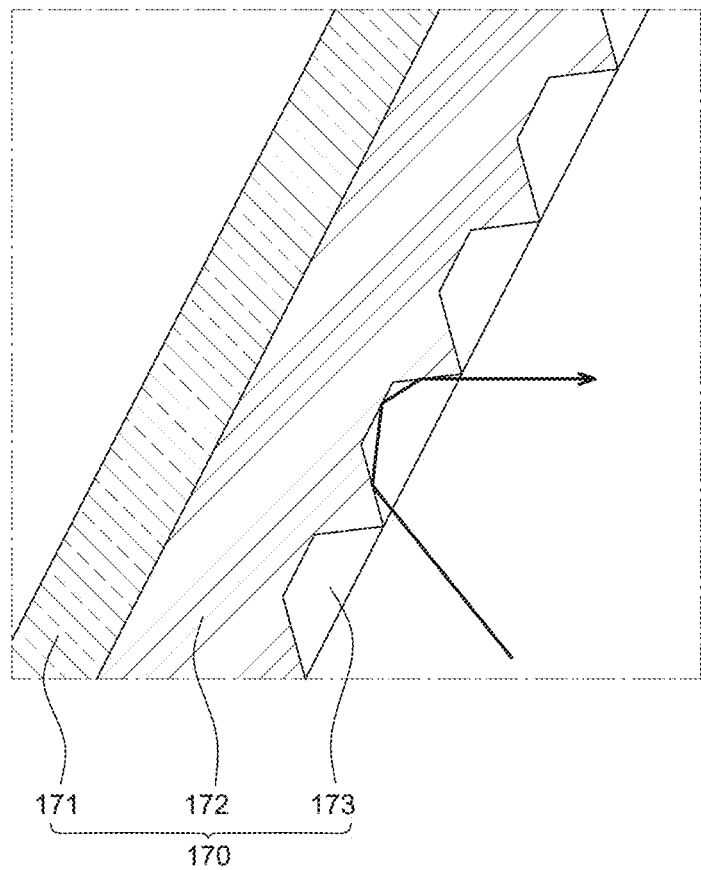

FIGS. 4A to 4D are schematic views for explaining a floating screen of a foldable display device according to an exemplary embodiment of the present disclosure. FIG. 4B is a schematic perspective view of a floating screen 170 and FIGS. 4C and 4D are enlarged cross-sectional views for explaining the floating screen 170 to be more specific.

Referring to FIG. 4A, in the second state in which the first display panel 111 is folded to be perpendicular to the second display panel 112, the floating screen 170 may be connected to the first display panel 111 by means of the first hinge unit H1. In the folded state of the first hinge unit H1, the floating screen 170 may be disposed to be adjacent to the first display panel 111. However, as described above, in the second state in which the first display panel 111 is folded to be perpendicular to the second display panel 112, the first hinge unit H1 is unfolded to the maximum so that the floating screen 170 is supported by the first hinge unit H1.

The floating screen 170 is connected to the display panel 110 and reflects the image displayed on the display panel 110. Specifically, the floating screen 170 is connected to the first display panel 111 and reflects the image displayed on the second display panel 112. Therefore, the floating screen 170 includes a base member 171, a first layer 172, and a second layer 173.

The base member 171 of the floating screen 170 is a configuration for supporting the floating screen 170. The base member 171 may have a hard plate shape formed of a material such as glass, PMMA, or PBMA or may have a soft film shape formed of a material such as PET or PC. At this time, the floating screen 170 needs to penetrate a first image IM1 displayed on the first display panel 111 so that a transmittance of the base member 171 is 90% or higher.

The first layer 172 and the second layer 173 may be formed of different resin. The first layer 172 and the second layer 173 may be formed of thermal or UV curable resin. At this time, the floating screen 170 needs to reflect a second image IM2 displayed on the second display panel 112 so that a refractive index of the second layer 173 is higher than that of the first layer 172.

At this time, in order to allow the floating screen 170 to reflect the second image IM2 displayed on the second display panel 112, the first layer 172 includes a plurality of concave portions and the second layer 173 fills the plurality of concave portions. At this time, as illustrated in FIG. 4B, each of the plurality of concave portions has a shape extending to the horizontal direction. At this time, in order to transmit the first image IM1 displayed on the first display panel 111 through the floating screen 170 and suppress the distortion of the first image IM1, a width of the plurality of concave portions in a width direction may be 5 μm or lower.

In order to allow the floating screen 170 to reflect the second image IM2 displayed on the second display panel 112 and maximize the usefulness of the used area of the first display panel 111, the plurality of concave portions of the first layer 172 may have an asymmetric shape. For example, when the plurality of concave portions is not disposed on the first layer 172 and an interface of the first layer 172 and the second layer 173 is flat, in order to reflect the second image IM2 displayed on the second display panel 111 to the front, an angle θ formed by the second display panel 112 and the floating screen 170 needs to be 45 degrees. However, when the angle formed by the second display panel 112 and the floating screen 170 is 45 degrees, a visibly shown area of the floating screen 170 is approximately 50% so that an actual used area of the first display panel 111 may be approximately 50%. Accordingly, in the foldable display device 100 according to the exemplary embodiment of the present disclosure, the plurality of concave portions of the first layer 172 has an asymmetric shape in the width direction. Therefore, the mounting angle of the floating screen 170, that is, the angle θ formed by the second display panel 112 and the floating screen 170 may be increased to be larger than 45 degrees.

For example, as illustrated in FIG. 4C, when the surfaces of the plurality of concave portions are formed as a curved surface and a flat surface, the flat surface is disposed above and the curved surface is disposed below. At this time, a width of the curved surface is formed to be larger than a width of the upper surface and a point that the flat surface and the curved surface meet is disposed to be closer to the upper end. Accordingly, even at a large mounting angle of the floating screen 170, the second image IM2 of the second display panel 112 may be reflected to the front direction by the floating screen 170.

Further, for example, as illustrated in FIG. 4D, when the surfaces of the plurality of concave portions are formed by a plurality of flat surfaces, a slope of the surface of the concave portion at the upper end may be sharper than a slope of the surface of the concave portion at the lower end. Accordingly, even at the larger mounting angle of the floating screen 170, the second image IM2 of the second display panel 112 may be reflected to the front direction by the floating screen 170.

Accordingly, the second image IM2 of the second display panel 112 can be reflected to the front direction even in a state in which the mounting angle of the floating screen 170 is increased using the floating screen 170 as illustrated in FIGS. 4A to 4D. Therefore, the utilized area is increased and a sense of unity of the first image IM1 of the first display panel 111 and the second image IM2 of the second display panel 112 may be increased.

Referring to FIG. 3B again, in the second state in which the first display panel 111 is folded to be perpendicular to the second display panel 112, the display panel 110 may display a stereoscopic image using the floating screen 170 disposed between the first display panel 111 and the second display panel 112.

Specifically, the first image IM1 of the first display panel 111 transmits the floating screen 170 as it is to be visible to the user and the second image IM2 of the second display panel 112 is reflected by the floating screen 170 to be visible to the user. At this time, the first display panel 111 is a transparent display panel so that when the user looks at the first display panel 111, the first display panel may be recognized to be transparent.

At this time, in order to display the stereoscopic image, the first image IM1 displayed on the first display panel 111 and the second image IM2 displayed on the second display panel 112 may be images obtained by photographing the same object at different focal points. That is, when the first image IM1 and the second image IM2 which are photographed at different focal points are floated, two images look overlapping in the air so that a pseudo hologram with a greater sense of depth and three-dimensional effect may be implemented.

At this time, in order to display the stereoscopic image, the first image IM1 displayed on the first display panel 111 may be a background image in one image and the second image IM2 displayed on the second display panel 112 may be an object image displayed in the background image in one image. That is, in one image, an image for the background is displayed by the first display panel 111 and an image for the object is displayed by the second display panel 112. Accordingly, when the first image IM1 and the second image IM2 are floated, the background image and the object image look overlapping in the air so that a pseudo hologram with a greater sense of depth and three-dimensional effect may be implemented.

However, the method of displaying the stereoscopic image by means of the display panel 110 may be implemented by a method of combining various images other than the above-described example, but is not limited to the above-described example.

Next, referring to FIGS. 3C and 3D, in a third state in which the first display panel 111 and the second display panel 112 are completely unfolded, the display panel 110 may display a flat image. In the third state, the floating screen 170 is disposed in the first display panel 111, but the floating screen 170 is highly transmissive so that the first image IM1 of the first display panel 111 is transmitted as it is. Therefore, the floating screen is not illustrated in FIGS. 3C and 3D.

Referring to FIG. 3C, in a state in which the display panel 110 is flat, the back plate 180 is located below the second display panel 112. At this time, the first display panel 111 is a transparent display panel so that the transmittances of the first display panel 111 and the second display panel 112 may be different. Therefore, when the first image IM1 and the second image IM2 are displayed on the first display panel 111 and the second display panel 112, a luminance difference may be caused.

Accordingly, referring to FIG. 3D, in a state in which the display panel 110 is flat, the back plate 180 slides to be disposed below the first display panel 111. As described above, the back plate 180 is opaque so that the luminance difference of the first display panel 111 and the second display panel 112 may be minimized by the back plate 180 disposed below the first display panel 111.

Further, the luminance and the resolution of the first display panel 111 which is a transparent display panel which needs to ensure the transmission unit may be lower than the luminance and the resolution of the second display panel 112 which is a non-transparent display panel. Therefore, when the display panel is driven in the third state, the second display panel 112 may be driven by downgrading the luminance and the resolution of the second display panel 112.

In the foldable display device 100 according to the exemplary embodiment of the present disclosure, the bottom plate 150 and the top plate 140 of the foldable display device 100 use a transparent material so that a transparent foldable display device may be implemented.

Further, in the foldable display device 100 according to the exemplary embodiment of the present disclosure, the floating screen 170 and the display panel 110 are used to display an image having a more three-dimensional effect. That is, in the foldable display device 100, the first display panel 111 which is a transparent display panel and the second display panel 112 and the floating screen 170 which are non-transparent display panels are used. Further, shapes of the plurality of concave portions of the floating screen 170 and a refractive index difference of the first layer 172 and the second layer 173 are used to implement a pseudo hologram having a sense of depth and a three-dimensional effect.

Further, in the foldable display device 100 according to the exemplary embodiment of the present disclosure, the mounting angle of the floating screen 170 is increased by the shapes of the plurality of concave portions of the floating screen 170. Accordingly, the utilized area is increased and the sense of unity of the first image IM1 of the first display panel 111 and the second image IM2 of the second display panel 112 may be increased.

Further, in the foldable display device 100 according to the exemplary embodiment of the present disclosure, the luminance difference between the first display panel 111 which is a transparent display panel and the second display panel 112 which is a non-transparent display panel may be minimized by the slidable back plate 180.

Figure 5:
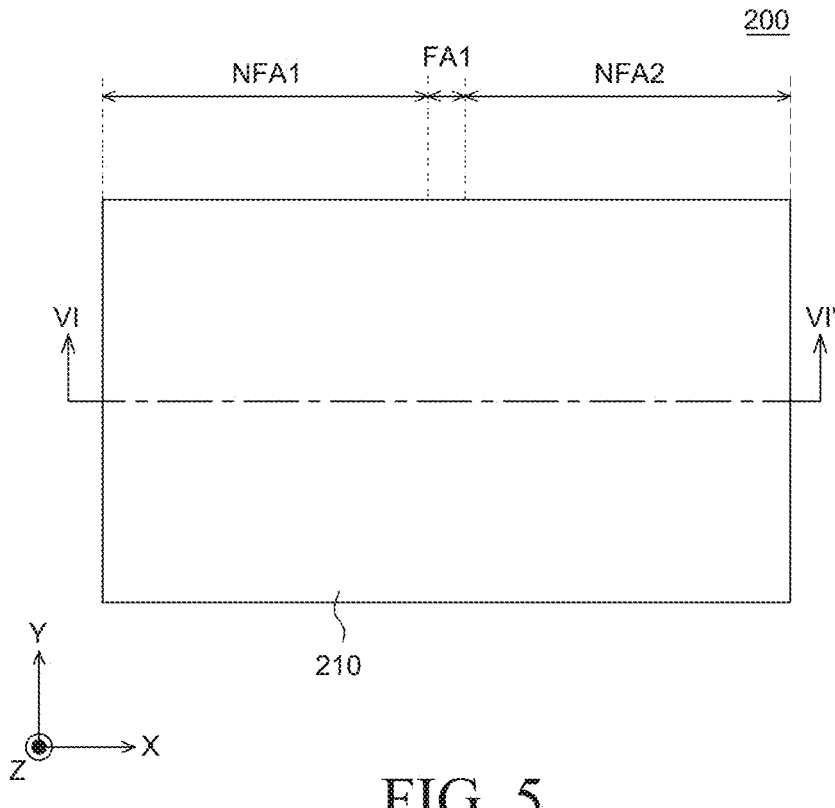
FIG. 5 is a schematic plan view of a foldable display device according to another exemplary embodiment of the present disclosure.
Figure 6:
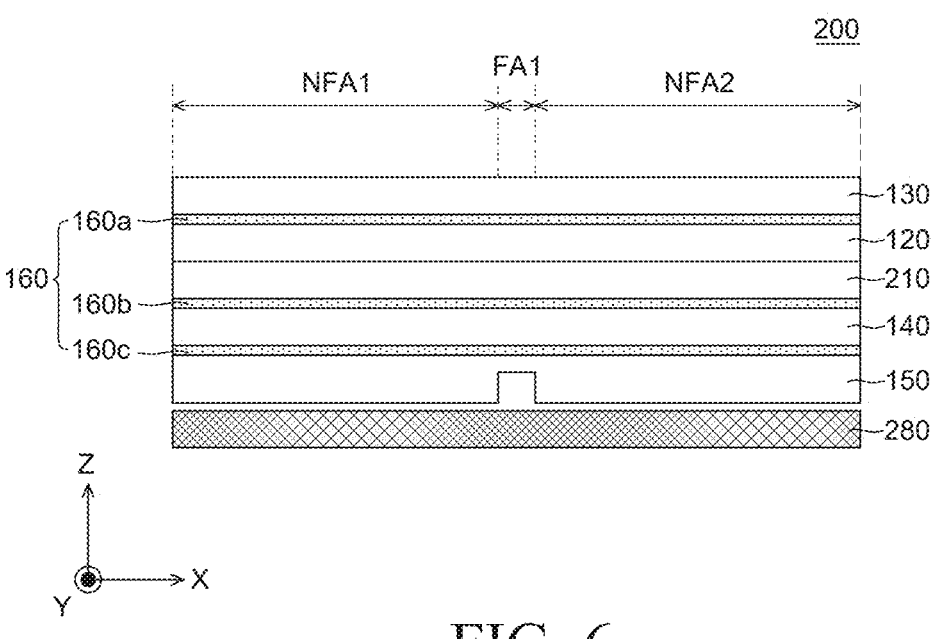
FIG. 6 is a schematic cross-sectional view taken along the line VI-VI' of FIG. 5.

FIG. 5 is a schematic plan view of a foldable display device according to another exemplary embodiment of the present disclosure. FIG. 6 is a schematic cross-sectional view taken along the line VI-VI' of FIG. 5. The foldable display device 200 of FIGS. 5 and 6 are substantially the same as the foldable display device 100 of FIGS. 1 to 4D except that the display panel 210 and the back plate 280 are different and the gap maintaining unit G is omitted so that a redundant description will be omitted.

Referring to FIG. 5, the display panel 210 may be a single transparent display panel. The display panel 210 may include a signal transparent display panel disposed in a first non-folding area NFA1, a first folding area FA1, and a second non-folding area NFA2. Therefore, light emitted from the display panel 210 which is a transparent display panel may be seen from both the upper surface and the lower surface. The display panel 210 is a transparent display panel so that a plurality of pixels of the display panel 210 includes a transmission unit and an emission unit. At this time, the display element may be disposed only in the emission unit, or disposed in the emission unit and the transmission unit. Further, a circuit unit for driving the display element may be disposed only in the emission unit. However, the display panel is not limited thereto and the pixel configuration of the display panel 210 may be set in various forms.

The back plate 280 is disposed below the bottom plate 150. The back plate 280 may be disposed below the display panel 210, the top plate 140, and the bottom plate 150. The back plate 280 may overlap the entire display panel 210. That is, the size of the back plate 280 may be equal to the size of the display panel 210.

The back plate 280 may be formed of an opaque material. The back plate 280 is a configuration for improving the visibility of the display panel 210 which is a transparent display panel and is disposed below the display panel 210. The back plate 280 may be a SUS plate, or a colored film, but is not limited thereto.

Hereinafter, various display states of the foldable display device 200 according to another exemplary embodiment of the present disclosure will be described in more detail with reference to FIGS. 7A to 7C.

Figure 7A:
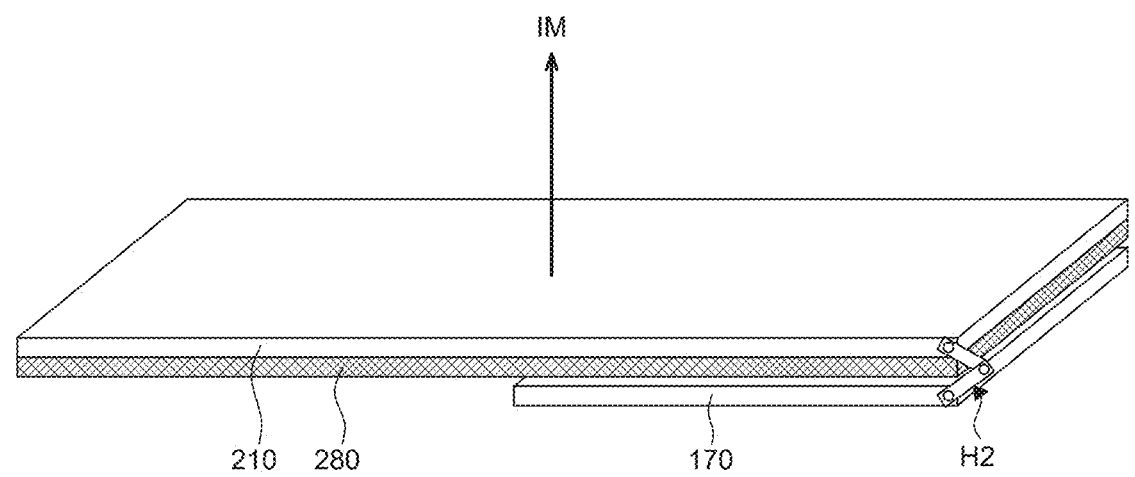
FIGS. 7A to 7C are schematic views for explaining a state of a foldable display device according to another exemplary embodiment of the present disclosure.
Figure 7B:
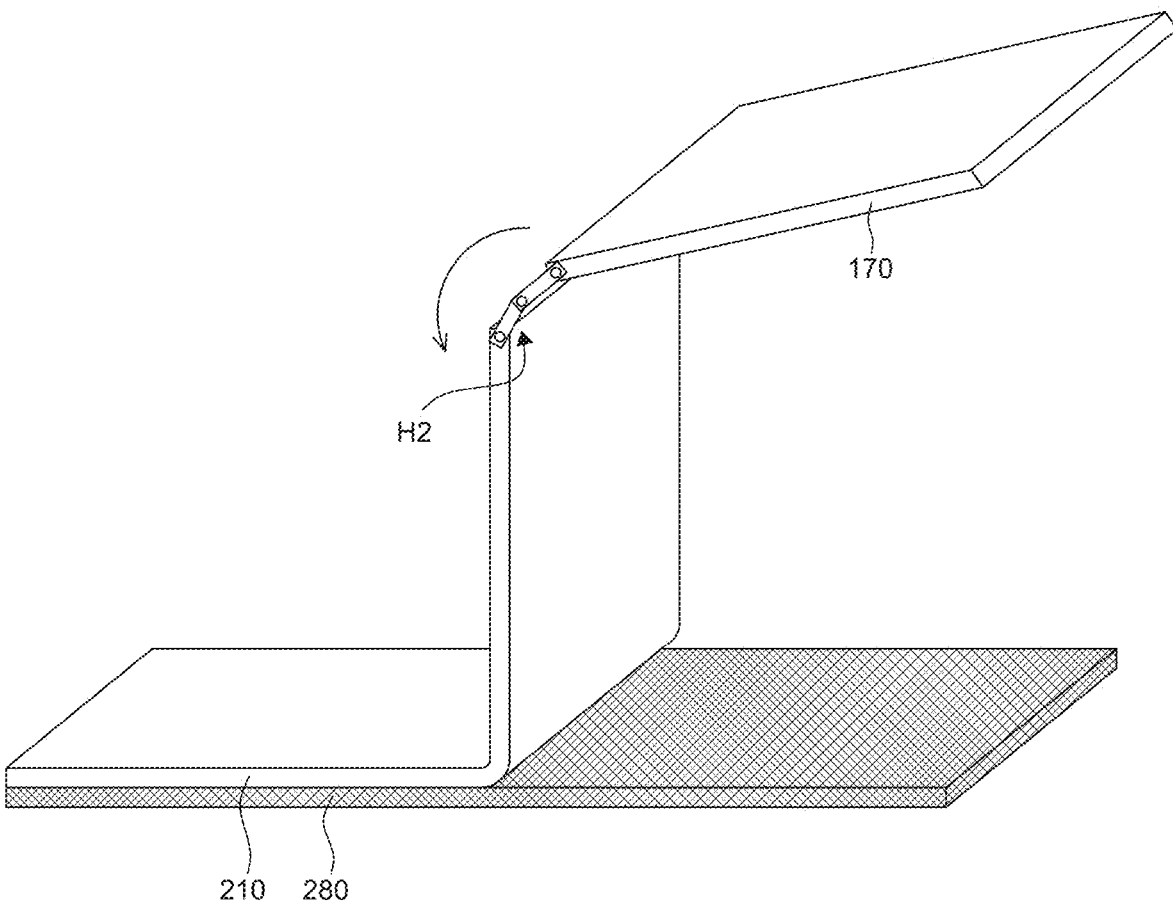
Figure 7C:
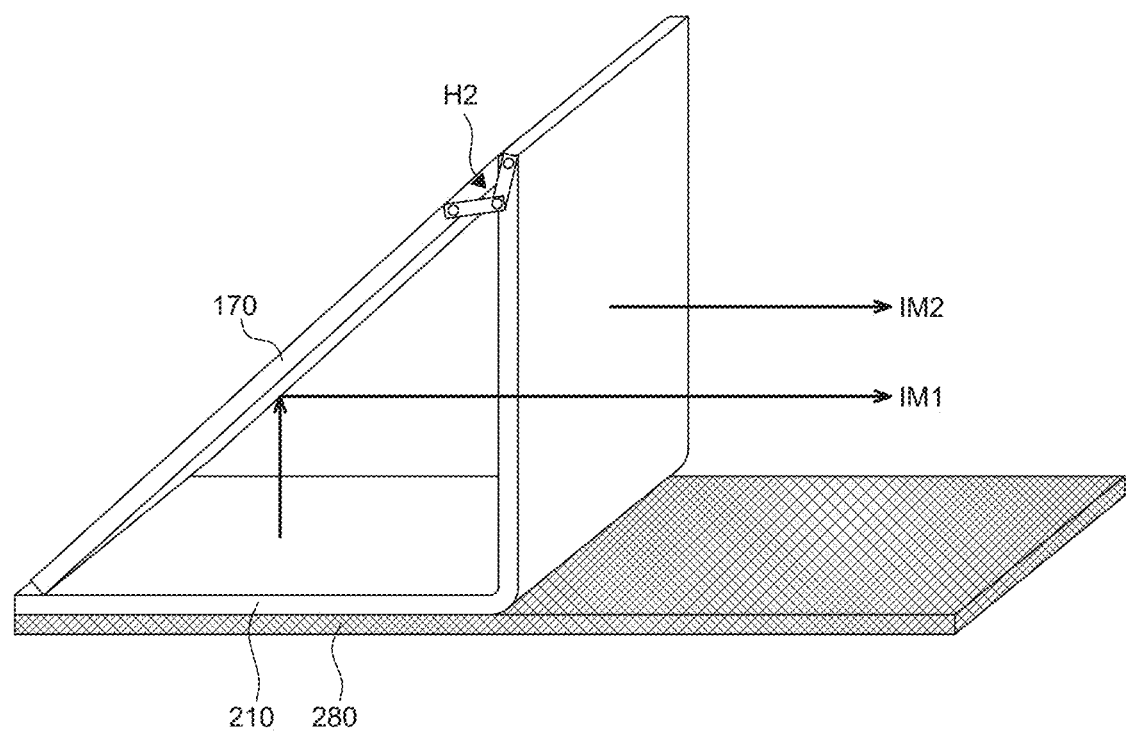

FIGS. 7A to 7C are schematic views for explaining a state of a foldable display device according to another exemplary embodiment of the present disclosure. FIG. 7A is a view for a first state in which the display panel 210 is completely unfolded, FIG. 7B is a view illustrating a process of folding the display panel 210, and FIG. 7C is a view illustrating a second state in which the display panel 210 is vertically folded. In FIGS. 7A to 7C, for the convenience of description, only the display panel 210, the back plate 280, the floating screen 170, and a second hinge unit H2 are illustrated.

First, referring to FIG. 7A, in the first state in which the display panel 210 is completely unfolded, the display panel 210 may perform flat image displaying. Therefore, the image IM may be implemented by the flat image displaying.

Specifically, the back plate 280 may be disposed below the display panel 210 which is a transparent display panel to improve the visibility. The display panel 210 is a transparent display panel so that the luminance of the display panel 210 may be degraded. Accordingly, the back plate 280 is disposed below the display panel 210 to improve the luminance of the display panel 210.

The floating screen 170 may be connected to one end of the display panel 210 by means of the second hinge unit H2. The second hinge unit H2 allows the floating screen 170 to be rotatable at one end of the display panel 210. That is, the floating screen 170 may be disposed by means of the second hinge unit H2 to be rotatable at one end of the display panel 210. In the first state, the floating screen 170 may be disposed below the back plate 280.

In order to switch to the second state illustrated in FIG. 7C, as illustrated in FIG. 7B, the display panel 210 is folded and the floating screen 270 rotates by means of the second hinge unit H2. For example, the display panel 210 is folded such that a flat portion disposed on the back plate 280 and a folded portion are perpendicular to each other and the second hinge unit H2 may rotate along one end of the display panel 210.

Therefore, referring to FIG. 7C, in the second state in which the display panel 210 is vertically folded, the display panel 210 may display a stereoscopic image using the floating screen 170.

Specifically, the first image IM1 of a horizontal portion of the display panel 210 is reflected from the floating screen 170 and transmits a vertical portion of the display panel 210 to be seen by the user and the second image IM2 of a vertical portion of the display panel 210 is directly seen by the user. At this time, the first display panel 210 is a transparent display panel so that when the user looks at the vertical portion of the display panel 210, the vertical portion may be recognized to be transparent.

At this time, for the stereoscopic image displaying, the first image IM1 and the second image IM2 may be images obtained by photographing the same object at different focal points. That is, when the first image IM1 and the second image IM2 which are photographed at different focal points are floated, two images look overlapping in the air so that a similar hologram with a greater sense of depth and three-dimensional effect may be implemented.

Further, for the stereoscopic image displaying, the second image IM2 is a background image in one image and the first image IM1 is an object image displayed in the background image in one image. That is, in one image, the image for the background is displayed by the vertical portion of the display panel 210 and the image for the object is displayed by the horizontal portion of the display panel 210. Accordingly, when the first image IM1 and the second image IM2 are floated, the background image and the object image look overlapping in the air so that a similar hologram with a greater sense of depth and three-dimensional effect may be implemented.

However, the method of displaying the stereoscopic image by means of the display panel 210 may be implemented by a method of combining various images other than the above-described example, but is not limited to the above-described example.

In the foldable display device 200 according to another exemplary embodiment of the present disclosure, the bottom plate 150 and the top plate 140 of the foldable display device 200 use a transparent material so that a transparent foldable display device may be implemented.

Further, in the foldable display device 200 according to another exemplary embodiment of the present disclosure, the floating screen 170 and the display panel 210 are used to display an image having a more three-dimensional effect. That is, in the foldable display device 200, the display panel 210 which is a transparent display panel and the floating screen 170 are used. Further, shapes of the plurality of concave portions of the floating screen 170 and a refractive index difference of the first layer 172 and the second layer 173 are used to implement a pseudo hologram having a sense of depth and a three-dimensional effect.

Further, in the foldable display device 200 according to another exemplary embodiment of the present disclosure, the mounting angle of the floating screen 170 is increased by the shapes of the plurality of concave portions of the floating screen 170. Accordingly, the utilized area is increased and the sense of unity of the first image IM1 and the second image IM2 may be increased.

Further, in the foldable display device 200 according to another exemplary embodiment of the present disclosure, the visibility of the display panel 210 which is a transparent display panel may be improved by the back plate 280.

Figure 8:
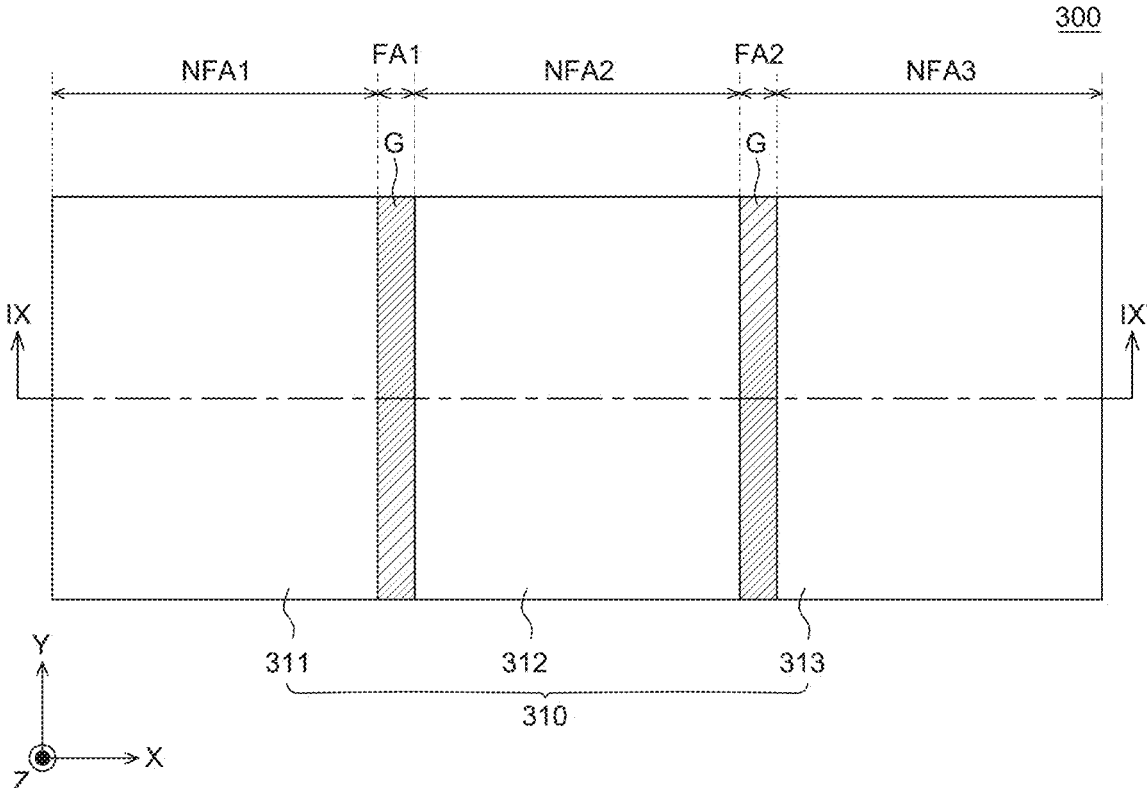
FIG. 8 is a schematic plan view of a foldable display device according to still another exemplary embodiment of the present disclosure.
Figure 9:
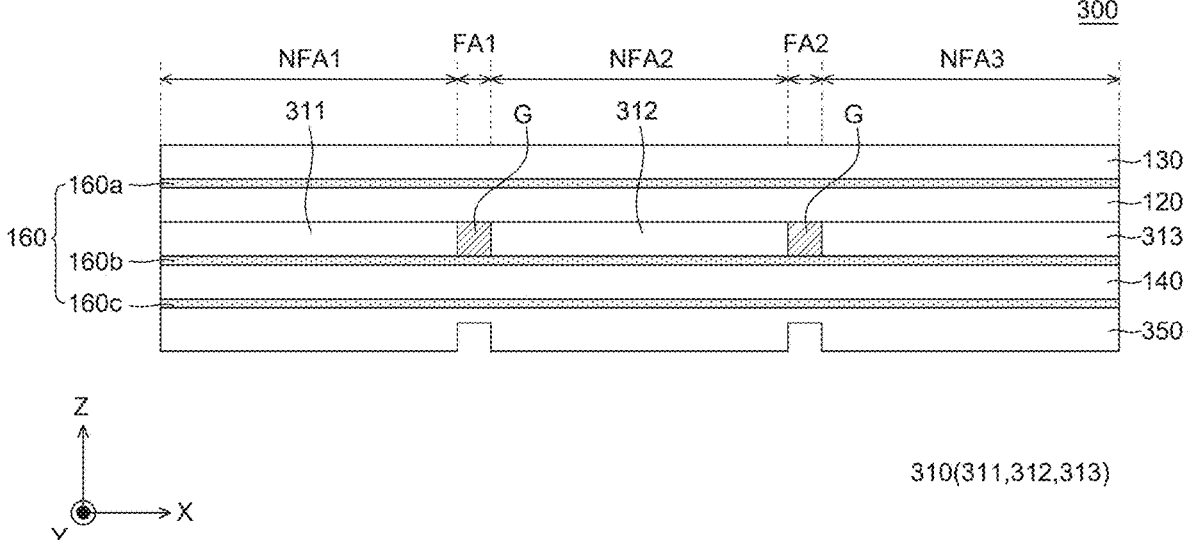
FIG. 9 is a schematic cross-sectional view taken along the line IX-IX' of FIG. 8.

FIG. 8 is a schematic plan view of a foldable display device according to still another exemplary embodiment of the present disclosure. FIG. 9 is a schematic cross-sectional view taken along the line IX-IX' of FIG. 8. A foldable display device 300 of FIGS. 8 and 9 are substantially the same as the foldable display device 100 of FIGS. 1 to 4D except for a display panel 310, a gap maintaining unit G, and a bottom plate 350 so that a redundant description will be omitted.

Referring to FIGS. 8 and 9, the foldable display device 300 according to still another exemplary embodiment of the present disclosure includes a first non-folding area NFA1, a first folding area FA1, a second non-folding area NFA2, a second folding area FA2, and a third non-folding area NFA3 which are sequentially located along a folding direction (an X-axis direction). The first folding area FA1 and the second folding area FA2 are areas which are folded when the foldable display device 300 is folded.

The first folding area FA1 and the second folding area FA2 are areas folded when the foldable display device 300 is folded so that the first folding area FA1 and the second folding area FA2 may be folded along a specific radius of curvature with respect to the folding area, that is, with respect to an X-axis direction of FIG. 1. When the first folding area FA1 and the second folding area FA2 are folded with respect to the folding direction (the X-axis direction), the first folding area FA1 and the second folding area FA2 may form a part of a circle or an oval. At this time, radii of curvature of each of the first folding area FA1 and the second folding area FA2 refer to a radius of a circle or an oval formed by the first folding area FA and the second folding area FA2, respectively.

The first non-folding area NFA1, the second non-folding area NFA2, and the third non-folding area NFA3 are not folded when the foldable display device 300 is folded. That is, the first non-folding area NFA1, the second non-folding area NFA2, and the third non-folding area NFA3 maintain a flat state when the foldable display device 300 is folded. At this time, the first folding area FA1 may be inner-folded such that the first non-folding area NFA1 and the second non-folding area NFA2 are folded to be opposite to each other. The second folding area FA2 may be inner-folded such that the second non-folding area NFA2 and the third non-folding area NFA3 are folded to be opposite to each other.

Referring to FIG. 8, the display panel 310 includes a first display panel 311 disposed in the first non-folding area NFA1, a second display panel 312 disposed in the second non-folding area NFA2, and a third display panel 313 disposed in the third non-folding area NFA3. The third display panel 313 may be a transparent display panel and the first display panel 311 and the second display panel 312 may be non-transparent display panels. That is, light emitted from the third display panel 313 which is a transparent display panel may be visible from both an upper surface and a lower surface and light emitted from the first display panel 311 and the second display panel 312 which are non-transparent display panels is visible only from the upper surface. Therefore, the first display panel 311 and the second display panel 312 may be a display panel 310 which is usually used. The third display panel 313 is a transparent display panel so that a plurality of pixels of the third display panel 313 includes a transmission unit and an emission unit. At this time, the display element may be disposed only in the emission unit, or disposed in the emission unit and the transmission unit. Further, a circuit unit for driving the display element may be disposed only in the emission unit, However, it is not limited thereto and the display element of the third display panel 313 may be set in various forms.

Referring to FIGS. 8 and 9, gap maintaining units G are disposed between the first display panel 311 and the second display panel 312 and between the second display panel 312 and the third display panel 313. That is, the gap maintaining unit G is disposed between the first display panel 311 and the second display panel 312 in the first folding area FA1 and is disposed between the second display panel 312 and the third display panel 313 in the second folding area FA2. The gap maintaining unit G may use a material having a high compressibility, and for example, a silicon based pad. A compression strain of the gap maintaining unit G may be 10 to 50%, but is not limited thereto.

The bottom plate 350 for supporting the display panel 310 is disposed on rear surfaces of the display panel 310 and the gap maintaining unit G. The bottom plate 350 supports the flexible substrate which configures the display panel 310 not to be sagged and protects components disposed on the flexible substrate from external moisture, heat, and shocks. Therefore, the bottom plate 350 reduces an entire thickness of the foldable display device 300 while supporting the display panel 310 to reduce the radii of curvature of the first folding area FA1 and the second folding area FA2.

The bottom plate 350 may be formed of a transparent material. For example, the bottom plate 350 may be formed of glass and has a thickness of approximately 300 μm, but is not limited thereto.

The bottom plate 350 may include a plurality of patterns in an area corresponding to the first folding area FA1 and the second folding area FA2. Here, the plurality of patterns may have a groove shape as illustrated in FIG. 9 or a hole shape. As the bottom plate 350 includes a plurality of patterns, it helps the foldable display device 300 to be easily folded and then easily unfolded after being folded to improve the folding performance of the foldable display device 300.

Hereinafter, various display states of the foldable display device 300 according to still another exemplary embodiment of the present disclosure will be described in more detail with reference to FIGS. 10A and 10B.

Figure 10A:
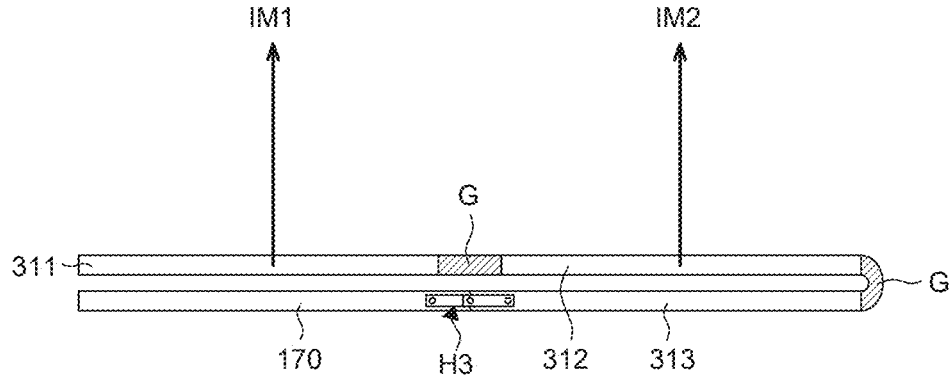
FIGS. 10A and 10B are schematic views for explaining a state of a foldable display device according to another exemplary embodiment of the present disclosure.
Figure 10B:
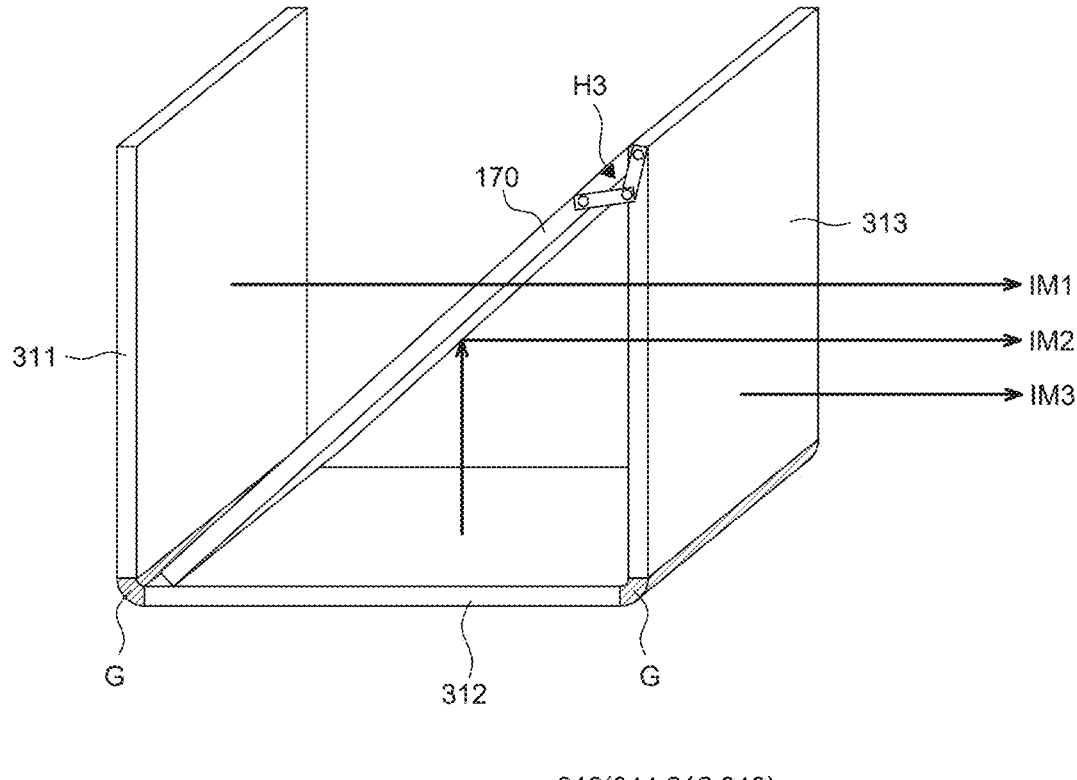

FIGS. 10A and 10B are schematic views for explaining a state of a foldable display device according to another exemplary embodiment of the present disclosure. FIG. 10A is a view illustrating a first state in which the first display panel 311 and the second display panel 312 are completely non-folded and the third display panel 313 is folded toward the lower surface of the second display panel 312. FIG. 10B is a view illustrating a second state in which the first display panel 311 is folded to be perpendicular to the second display panel 312 and the third display panel 313 is folded to be perpendicular to the second display panel 312. In FIGS. 10A and 10B, for the convenience of description, only the display panel 310, the gap maintaining unit G, a floating screen 170, and a third hinge unit H3 are illustrated.

First, referring to FIG. 10A, in the first state in which the first display panel 311 and the second display panel 312 are completely non-folded and the third display panel 313 is folded toward the lower surface of the second display panel 312, the display panel 310 may perform flat image displaying.

The first display panel 311 and the second display panel 312 are non-transparent display panels so that the floating screen 170 and the third display panel 313 disposed below the first display panel 311 and the second display panel 312 are not visible to the user. Accordingly, the user may view the first image IM1 of the first display panel 311 and the second image IM2 of the second display panel 312 as flat images.

Next, referring to FIG. 10B, in the second state in which the first display panel 311 is folded to be perpendicular to the second display panel 312 and the third display panel 313 is folded to be perpendicular to the second display panel 312, the display panel 310 may perform stereoscopic image displaying.

At this time, in order to switch to the second state, as illustrated in FIG. 10B, the display panel 310 is folded and the floating screen 170 rotates by means of the third hinge unit H3. That is, the first display panel 311 is folded to be perpendicular to the second display panel 312, the third display panel 313 is folded to be perpendicular to the second display panel 312, and the third hinge unit H3 rotates along one end of the third display panel 313.

Accordingly, the first image IM1 of the first display panel 311 which is a non-transparent display panel penetrates the floating screen 170 and the third display panel 313 which is a transparent display panel to be visible to the user. Further, the second image IM2 of the second display panel 312 which is a non-transparent display panel is reflected by the floating screen 170 to penetrate the third display panel 313 to be visible to the user. The third image IM3 of the third display panel 313 which is a transparent display panel is visible to the user from the front.

At this time, in order to display the stereoscopic image, the first image IM1 displayed on the first display panel 311, the second image IM2 displayed on the second display panel 312, and the third image IM3 displayed on the third display panel 313 may be images obtained by photographing the same object at different focal points. That is, when the first image IM1, the second image IM2, and the third image IM3 which are photographed at different focal points are floated, three images look overlapping in the air so that a pseudo hologram with a greater sense of depth and three-dimensional effect may be implemented.

Further, in order to display the stereoscopic image, the first image IM1 displayed on the first display panel 311 may be a background image in one image and the second image IM2 and the third image IM3 displayed on the second display panel 312 and the third display panel 313 may be an object image displayed in the background image in one image. That is, in one image, an image for the background is displayed by the first display panel 311 and an image for the object is displayed by the second display panel 312 and the third display panel 313. Accordingly, when the first image IM1, the second image IM2, and the third image IM3 are floated, the background image and the object image look overlapping in the air so that a similar hologram with a greater sense of depth and three-dimensional effect may be implemented.

However, the method of displaying the stereoscopic image by means of the display panel 310 may be implemented by a method of combining various images other than the above-described example, but is not limited to the above-described example.

In the foldable display device 300 according to still another exemplary embodiment of the present disclosure, the bottom plate 350 and the top plate 140 of the foldable display device 300 use a transparent material so that a transparent foldable display device may be implemented.

Further, in the foldable display device 300 according to still another exemplary embodiment of the present disclosure, the floating screen 170 and the display panel 310 are used to display an image having a more three-dimensional effect. That is, in the foldable display device 300, the third display panel 313 which is a transparent display panel and the first display panel 311, the second display panel 312, and the floating screen 170 which are non-transparent display panels are used. Further, shapes of the plurality of concave portions of the floating screen 170 and a refractive index difference of the first layer 172 and the second layer 173 are used to implement a pseudo hologram having a sense of depth and a three-dimensional effect.

Further, in the foldable display device 300 according to still another exemplary embodiment of the present disclosure, the mounting angle of the floating screen 170 is increased by the shapes of the plurality of concave portions of the floating screen 170. Accordingly, the utilized area is increased and the sense of unity of the first image IM1, the second image IM2, and the third image IM3 may be increased.

The exemplary embodiments of the present disclosure can also be described as follows:

According to an aspect of the present disclosure, there is provided a foldable display device. The foldable display device comprises a display panel in which at least a partial area includes a transparent display panel; and a floating screen connected to the display panel and reflecting an image displayed on the display panel.

The foldable display device may further comprise a first non-folding area, a second non-folding area, and a first folding area between the first non-folding area and the second non-folding area. The display panel may include a transparent display panel disposed in the first non-folding area and a non-transparent display panel disposed in the second non-folding area and the floating screen may be disposed between the transparent display panel and the non-transparent display panel.

The foldable display device may further comprise a hinge unit connecting the transparent display panel and the floating screen and supporting the floating screen when the first folding area is folded.

When the transparent display panel and the non-transparent display panel are perpendicular to each other, an angle formed by the floating screen and the non-transparent display panel may be 45 degrees or larger.

The floating screen may reflect an image displayed on the non-transparent display panel.

An image displayed on the transparent display panel and an image displayed on the non-transparent display panel may be images obtained by photographing the same object at different focal points.

An image displayed on the transparent display panel may be a background image and an image displayed on the non-transparent display panel may be an object image displayed in the background image.

The foldable display device may further comprise a gap maintaining unit disposed between the transparent display panel and the non-transparent display panel in the first folding area.

The foldable display device may further comprise a bottom plate disposed below the display panel and the gap maintaining unit and including a plurality of patterns in an area corresponding to the first folding area.

The bottom plate may be formed of glass.

The foldable display device may further comprise an opaque back plate configured to slide below the display panel to overlap any one of the transparent display panel and the non-transparent display panel.

The foldable display device may further comprise a first non-folding area, a second non-folding area, and a first folding area between the first non-folding area and the second non-folding area. The display panel may include a single transparent display panel disposed in the first non-folding area, the first folding area, and the second non-folding area, and the floating screen may be disposed to be rotatable at one end of the transparent display panel.

The foldable display device may further comprise an opaque back plate disposed below the display panel to overlap the entire display panel.

The foldable display device may further comprise a first non-folding area, a second non-folding area, a third non-folding area, a first folding area between the first non-folding area and the second non-folding area, and a second folding area between the second non-folding area and the third non-folding area. The display panel may include a first non-transparent display panel disposed in the first non-folding area, a second non-transparent display panel disposed in the second non-folding area, and a transparent display panel disposed in the third non-folding area, and the floating screen may be disposed to be rotatable at one end of the transparent display panel.

The foldable display device may further comprise a first gap maintaining unit disposed between the first non-transparent display panel and the second non-transparent display panel in the first folding area and a second gap maintaining unit disposed between the second non-transparent display panel and the transparent display panel in the second folding area.

The floating screen may include a base member; a first layer disposed on the base member and including a plurality of concave portions; and a second layer filling the plurality of concave portions of the first layer and having a refractive index higher than that of the first layer.

Each of the plurality of concave portions may have an asymmetric shape in a width direction.

Surfaces of the plurality of concave portions may be formed by a plurality of flat surfaces.

The plurality of concave portions may be formed by a curved surface and a flat surface, and a width of the curved surface is larger than a width of the flat surface.

It will be apparent to those skilled in the art that various modifications and variations can be made in the foldable display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A foldable display device, comprising:
a display panel; and
a floating screen having one end contacting or connected to the display panel and an opposing end not attached to the display panel,
wherein the display panel includes:
    a non-transparent display panel; and
    a transparent display panel which is connected to the non-transparent display panel, self-luminous, and configured to transmit a background, and
wherein the floating screen reflects an image displayed on the non-transparent display panel.

2. The foldable display device according to claim 1, further comprising:
a first non-folding area, a second non-folding area, and a first folding area between the first non-folding area and the second non-folding area,
wherein the transparent display panel is disposed in the first non-folding area, the non-transparent display panel is disposed in the second non-folding area, and the floating screen is disposed between the transparent display panel and the non-transparent display panel.

3. The foldable display device according to claim 2, further comprising:
a hinge unit connecting the transparent display panel and the floating screen and supporting the floating screen when the first folding area is folded.

4. The foldable display device according to claim 3, wherein when the transparent display panel and the non-transparent display panel are folded to be perpendicular to each other, an angle formed by the floating screen and the non-transparent display panel is 45 degrees or larger.

5. The foldable display device according to claim 1, wherein an image displayed on the transparent display panel and the image displayed on the non-transparent display panel are images obtained by photographing the same object at different focal points.

6. The foldable display device according to claim 1, wherein an image displayed on the transparent display panel is a background image and the image displayed on the non-transparent display panel is an object image displayed in the background image.

7. The foldable display device according to claim 2, further comprising:
a first gap maintaining unit disposed between the transparent display panel and the non-transparent display panel in the first folding area.

8. The foldable display device according to claim 7, further comprising:
a bottom plate disposed below the display panel and the first gap maintaining unit and including a plurality of patterns in an area corresponding to the first folding area.

9. The foldable display device according to claim 8, wherein the bottom plate is formed of glass.

10. The foldable display device according to claim 2, further comprising:

an opaque back plate configured to slide below the display panel to overlap any one of the transparent display panel and the non-transparent display panel.

11. The foldable display device according to claim 1, further comprising:
a first non-folding area, a second non-folding area, and a first folding area between the first non-folding area and the second non-folding area,
wherein the display panel includes a single transparent display panel disposed in the first non-folding area, the first folding area, and the second non-folding area, and the floating screen is disposed to be rotatable at one end of the transparent display panel.

12. The foldable display device according to claim 11, further comprising:
an opaque back plate disposed below the display panel to overlap the entire display panel.

13. The foldable display device according to claim 1, further comprising:
a first non-folding area, a second non-folding area, a third non-folding area, a first folding area between the first non-folding area and the second non-folding area, and a second folding area between the second non-folding area and the third non-folding area,
wherein the display panel includes a first non-transparent display panel disposed in the first non-folding area, a second non-transparent display panel disposed in the second non-folding area, and a transparent display panel disposed in the third non-folding area, and the floating screen is disposed to be rotatable at one end of the transparent display panel.

14. The foldable display device according to claim 13, further comprising:
a first gap maintaining unit which is disposed between the first non-transparent display panel and the second non-transparent display panel in the first folding area; and
a second gap maintaining unit which is disposed between the second non-transparent display panel and the transparent display panel in the second folding area.

15. The foldable display device according to claim 1, wherein the floating screen includes:
a base member;
a first layer disposed on the base member and including a plurality of concave portions; and
a second layer filling the plurality of concave portions of the first layer and having a refractive index higher than that of the first layer.

16. The foldable display device according to claim 15, wherein each of the plurality of concave portions has an asymmetric shape in a width direction.

17. The foldable display device according to claim 15, wherein surfaces of the plurality of concave portions are formed by a plurality of flat surfaces.

18. The foldable display device according to claim 15, wherein the plurality of concave portions is formed by a curved surface and a flat surface, and a width of the curved surface is larger than a width of the flat surface.

19. The foldable display device of claim 1, wherein the display panel further includes a gap maintaining unit connected directly between the non-transparent display panel and the transparent display panel.

20. The foldable display device of claim 19, wherein:
the gap maintaining unit includes a compressible material; and the non-transparent display panel and the transparent display panel are foldable toward each other as a shape of the gap maintaining unit changes.

\* \* \* \* \*